US007700225B2

(12) United States Patent
Jung et al.

(10) Patent No.: US 7,700,225 B2
(45) Date of Patent: Apr. 20, 2010

(54) BINDER AND ELECTRODE FOR LITHIUM BATTERY, AND LITHIUM BATTERY CONTAINING THE SAME

(75) Inventors: In-Sun Jung, Suwon-si (KR); Jin-Hwan Park, Yongin-si (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 921 days.

(21) Appl. No.: 10/922,919

(22) Filed: Aug. 23, 2004

(65) Prior Publication Data

US 2005/0048368 A1    Mar. 3, 2005

(30) Foreign Application Priority Data

Aug. 27, 2003  (KR)  ...................... 10-2003-0059666

(51) Int. Cl.
| | |
|---|---|
| H01M 6/00 | (2006.01) |
| H01M 10/00 | (2006.01) |
| H01M 4/62 | (2006.01) |
| H01M 4/02 | (2006.01) |
| C08F 14/18 | (2006.01) |
| C08F 144/18 | (2006.01) |
| C08F 214/18 | (2006.01) |

(52) U.S. Cl. ...................... 429/122; 429/217; 429/209; 526/255

(58) Field of Classification Search ................. 429/122, 429/212, 217, 209; 526/255
See application file for complete search history.

(56) References Cited

U.S. PATENT DOCUMENTS

| 3,931,446 | A | 1/1976 | Murayama et al. |
| 5,246,796 | A | 9/1993 | Nagamine et al. |
| 6,426,165 | B1 | 7/2002 | Coustier et al. |
| 2003/0104273 | A1* | 6/2003 | Lee et al. ..................... 429/144 |

OTHER PUBLICATIONS

Abbrent et al., Crystallinity and Morphology of PVdF-HFP-based Gel Electrolytes, 2001, Elsevier, Polymer 42(2001), pp. 1407-1416.*
Chinese Office action from the State Intellectual Property Office of People's Republic of China issued in Applicant's corresponding Chinese Patent Application No. 200410085178.7 dated Sep. 7, 2007 (along with an English translation).
Registration Determination Certificate from the Chinese Intellectual Property Office issued in Applicant's corresponding Chinese Patent Application No. ZL200410085178.7 dated Aug. 13, 2008.

* cited by examiner

Primary Examiner—Patrick Ryan
Assistant Examiner—Helen O Conley
(74) Attorney, Agent, or Firm—Robert E. Bushnell, Esq.

(57) ABSTRACT

A lithium battery binder includes polyvinylidenefluoride (PVDF) having an IR absorption peak ratio of $I_\gamma$ in a range from 0.35 to 1.00, wherein $I_\gamma$ is equal to $I_{820-850}/I_{860-880}$ where $I_{820-850}$ is a peak height resulting from a $CH_2$ rocking band in γ-phase PVDF and $I_{860-880}$ is a peak height resulting from backbones in α- and γ-phase PVDF. The lithium battery containing the cathode and/or the anode which incorporates the binder improves the charge/discharge characteristics and the lifespan characteristics of a lithium battery.

9 Claims, 5 Drawing Sheets

γ phase -> α phase TRANSFORMATION

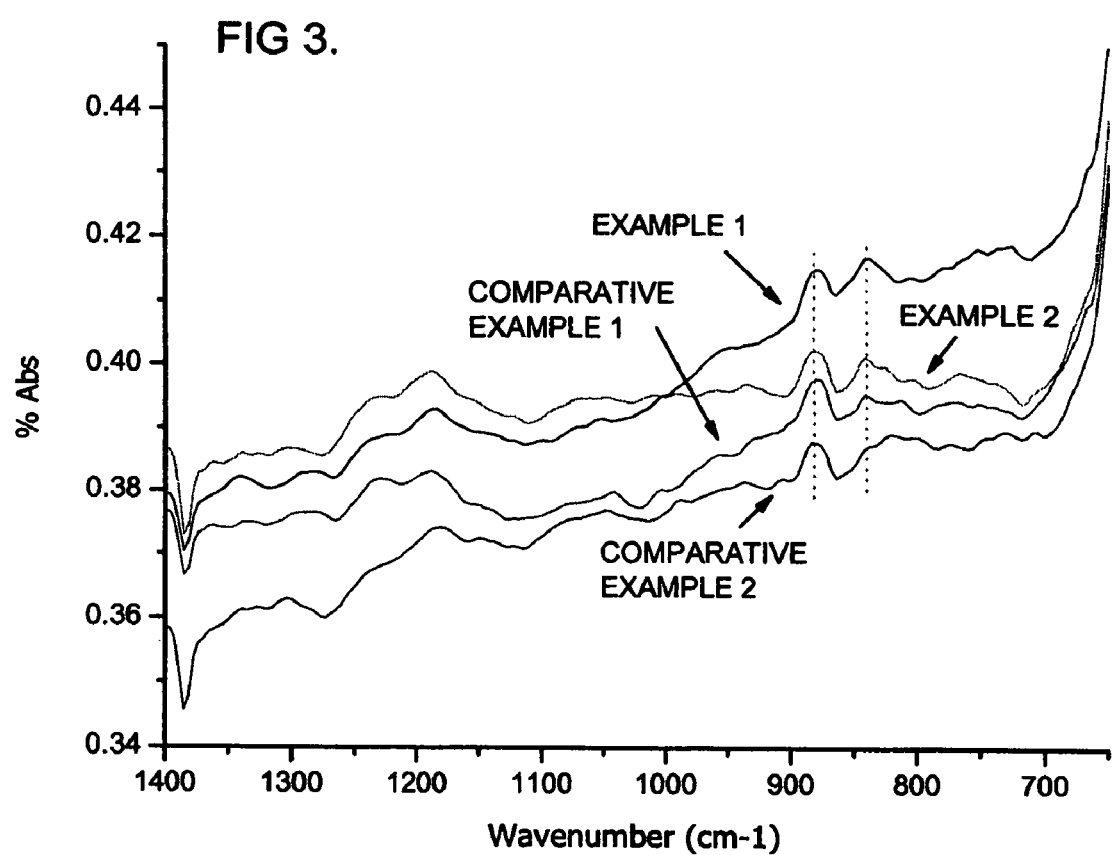

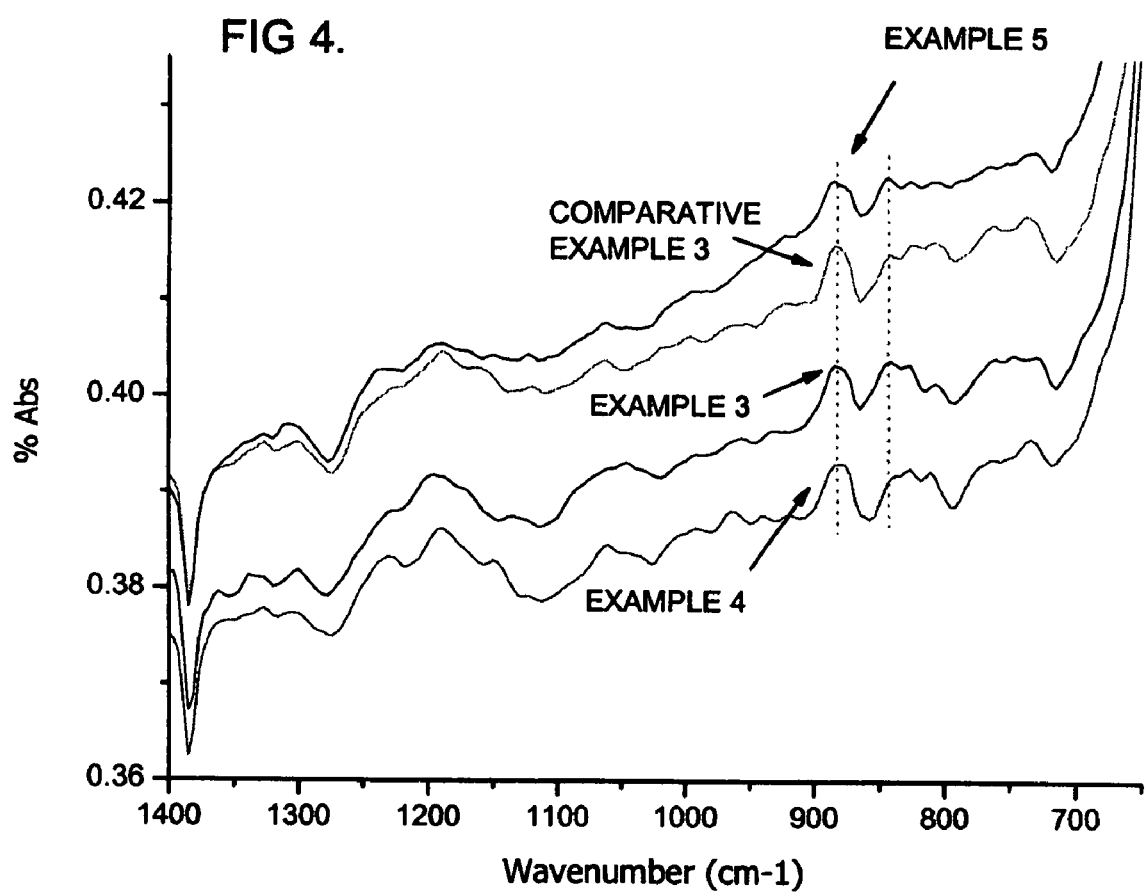

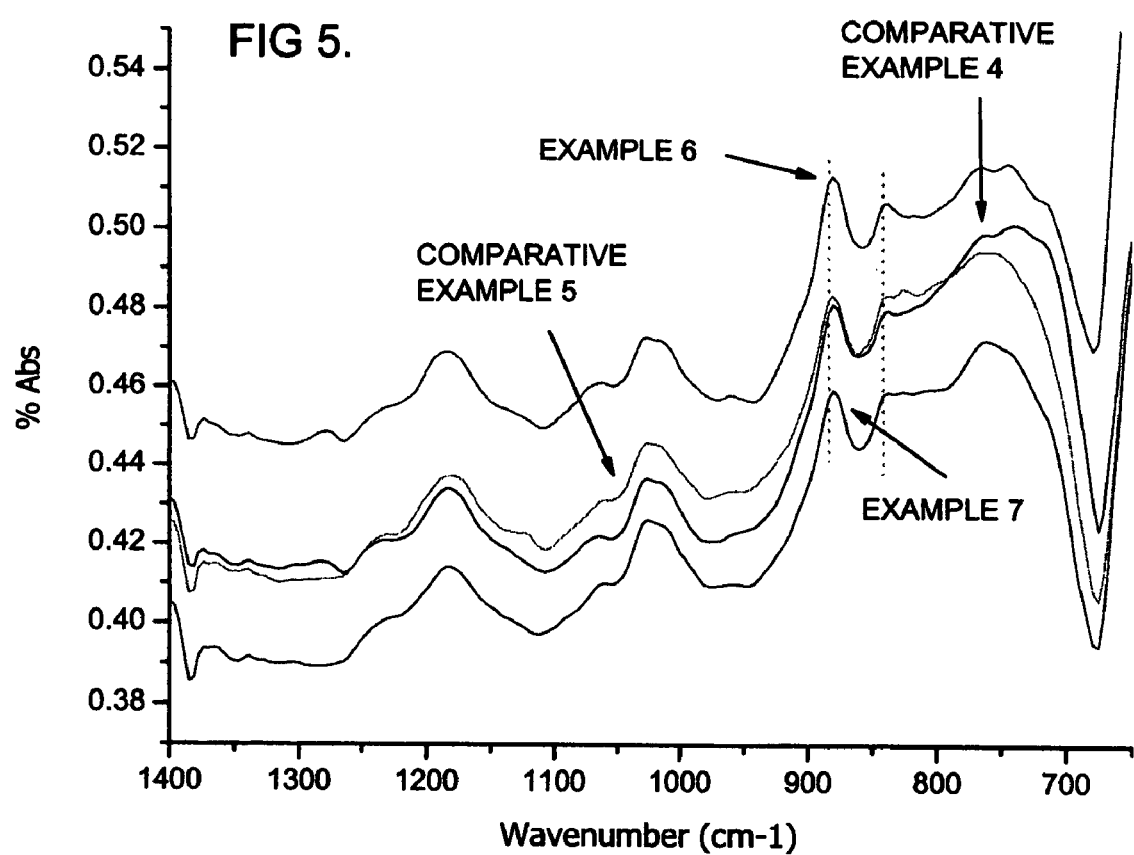

BINDER AND ELECTRODE FOR LITHIUM BATTERY, AND LITHIUM BATTERY CONTAINING THE SAME

CLAIM OF PRIORITY

This application claims all benefits accruing under 35 U.S.C. §119 from the Korean Patent Application No. 2003-59666 for BINDER AND ELECTRODE FOR LITHIUM BATTERY, AND LITHIUM BATTERY CONTAINING THE SAME, filed on Aug. 27, 2003, in the Korean Intellectual Property Office, the disclosure of which is incorporated herein in its entirety by reference.

BACKGROUND OF THE INVENTION

1. Field of the Invention

The present invention relates to a binder and an electrode for lithium batteries, and a lithium battery using the same, and more particularly, to a lithium battery binder and a lithium battery electrode with enhanced charge/discharge characteristics and lifespan characteristics, and a lithium battery containing the same.

2. Description of the Related Art

With the increasing supply of portable electronic devices, such as PDAs, mobile phones and laptop computers, their use range has been widened. Accordingly, the requirement for more compact, thinner, and lightweight batteries with high performance as power sources has been increasing, and much research on batteries has been conducted.

Since lithium batteries are lightweight and have higher energy density, they have been used as major power sources for such potable devices.

Cathode active materials for lithium batteries may include Li-containing transition metal oxides, such as $LiCoO_2$ and $LiNiO_2$, and chalcogen compounds, such as $MoS_2$. Since these compounds have layer-crystalline structures, Li ions can be reversibly intercalated or deintercalated. Accordingly, these compounds have been widely utilized as cathode active materials for lithium batteries.

Metal lithium can be used as an anode active material. However, lithium ions of lithium are intercalated and deintercalated. Then, needle-shaped lithium dendrites grow on the surface of lithium because the lithium repeatedly dissolves and precipitates during charging/discharging of the battery. The needle-shaped dendrites have lower charge/discharge efficiency and cause an internal short-circuit by contacting a cathode.

To solve these problems, use of lithium alloy, metal powder, graphitic or carbonaceous materials, metal oxides, or metal sulfides, which can reversibly intercalates and deintercalates Li ions, as an anode material is under consideration. However, when a sheet-type anode made of a lithium alloy is used in a battery, the sheet-type alloy becomes thinner during charging/discharging, thereby degrading a current collecting property. Thus, the charge/discharge characteristics deteriorate.

When a sheet-type electrode is made of metal powder, a carbonaceous material, metal oxide, or metal sulfide powder, a binder is further used because these materials alone in powder form cannot form electrodes. For example, when manufacturing an anode using a carbonaceous material, it is common to add an elastic rubber-based polymer material as a binder.

When manufacturing an anode using metal oxides or metal sulfides, a conducting agent, in addition to the binder, is added to improve the charge/discharge characteristics. In general, when manufacturing an anode using a carbonaceous material, the carbonaceous material is pulverized into powder and a binder is added. However, if a conventional rubber-based polymer material is utilized as a binder, graphite particles may be coated depending on the amount of the binder, thereby hindering intercalation and deintercalation of lithium ions and deteriorating the high efficiency discharge characteristics.

If a conventional binder is used alone, regardless of the kind and form of a carbonaceous material, a large amount of binder should be added because a binding force between a metallic core material and the conventional binder is weak. However, when a large amount of binder is added to enhance the binding force, the surface of a carbonaceous material is coated by the binder. Therefore, the high efficiency discharge characteristics deteriorate. On the contrary, if a small amount of binder is used to maintain the discharge characteristics, the sheet-type electrode cannot be easily manufactured because a material for an electrode plate separates from the core material. Furthermore, the failure ratio increases in the manufacture of electrode plates.

Meanwhile, much research into polyvinylidenefluoride (hereinafter referred to as PVDF), which is commonly used as a lithium battery binder, has been carried out to improve its properties. For example, U.S. Pat. No. 6,426,165 discloses that the compounds with higher melting points have superior charge/discharge characteristics, wherein the melting points of PVDF polymers were measured using a differential scanning calorimeter (DSC). In this case, however, an anode surface and a cathode surface are separated from a PVDF binder layer. A mixture of PVDF, an anode material and a cathode material is not used to manufacture a battery. Therefore, the composition of the crystalline phases of PVDF, the anode active material, and the cathode active material in the battery, and how the composition varies depending on processing conditions are unknown.

In U.S. Pat. No. 5,246,796, the ratios of specific peaks in an X-ray pattern and charge/discharge maintenance rates are measured when a PVDF binder is dried at different temperatures. However, this patent simply shows that a higher drying temperature leads to lower charge/discharge efficiency. In addition, in this patent, the charge/discharge efficiency is low so that the charge/discharge maintenance rate is relatively low.

In U.S. Pat. No. 3,931,446, specific conditions in which α- and β-phases-containing films can be formed are defined. However, the relationship between the composition of a PVDF binder, the lifespan of a battery, and the battery efficiency is not disclosed in the patent.

SUMMARY OF THE INVENTION

It is therefore an object of the present invention to provide an improved lithium battery binder.

It is also an object of the present invention to provide an improved lithium battery electrode.

It is another object of the present invention to provide an improved lithium battery.

It is further an object of the present invention to provide a lithium battery binder with enhanced charge/discharge characteristics and lifespan characteristics.

It is yet another object of the present invention to provide a method of manufacturing the lithium battery electrode.

In order to achieve the above and other objectives, a preferred embodiment of the present invention may be constructed with a lithium battery binder containing polyvinylidenefluoride(PVDF) having an infrared (IR) absorption peak ratio of $I_\gamma$ in a range from 0.35 to 1.00, wherein $I_\gamma$ is equal to $I_{820-850}/I_{860-880}$ where $I_{820-850}$ is a peak height resulting from a $CH_2$ rocking band in γ-phase PVDF and $I_{860-880}$ is a peak height resulting from a backbone in α-phase PVDF and γ-phase PVDF.

According to another aspect of the present invention, there is provided a lithium battery electrode which contains a cathode active material or an anode active material, a conducting agent, an organic solvent, and PVDF having an IR absorption peak ratio of $I_\gamma$ in a rage from 0.35 to 1.00, wherein $I_\gamma$ is the same as described above.

According to another aspect of the present invention, there is provided a method of fabricating a lithium battery electrode, the method including: forming an active material solution by mixing an electrode active material, a conducting agent, PVDF and an organic solvent; coating a surface of an electrode plate with the active material solution and drying the coated surface; and pressurizing and drying the electrode plate (i.e., the cathode plate or the anode plate) in a vacuum under pressure.

According to another aspect of the present invention, there is provided a lithium battery containing the lithium battery cathode and/or anode.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein:

FIG. 3 is the FT-IR spectra of the PVDF binder when used together with anode active materials of Examples 1 and 2 and Comparative Examples 1 and 2;

FIG. 4 is the FT-IR spectra of the PVDF binder when used together with anode active materials of Examples 3 through 5 and Comparative Example 3; and FIG. 5 is the FT-IR spectra of the PVDF binder when used together with cathode active materials of Examples 6 and 7 and Comparative Examples 4 and 5.

DETAILED DESCRIPTION OF THE PREFERRED EMBODIMENTS

In the present invention, the crystalline phase composition of a polyvinylidenefluoride binder (PVDF), which could not be measured using a melting point, is measured and used to control or improve the characteristics of a lithium battery. In other words, the characteristics of a lithium battery may be controlled and improved by varying the crystalline phase composition of the PVDF binder. Particularly, the content of a γ-phase in the PVDF binder affects the charge/discharge efficiency and the lifespan characteristics of the lithium battery.

PVDF, which is used as an anode active material binder and a cathode active material binder for lithium batteries, exhibits three crystalline phases (α, β, and γ) according to crystallization temperature and pressure, mechanical stress, and a solvent, and crystallization conditions. The α-phase is spherical and has a large crystal size. The α-phase can be relatively easily formed, and the conformational isomer of each chain has a conformation of alternating trans-gauche links (space group, P2cm). The γ-phase can be generated when PVDF is crystallized in solution, and has a trans conformation (space group, Cm2m), in which the crystal size is small and uniform. The β-phase is created under harsh conditions, such as high pressure, high temperature, and annealing (space group, C2cm).

In a FT-IR spectrum, the β-phase has specific peaks at frequencies of 520 and 1280 $cm^{-1}$; the α-phase has specific peaks at frequencies of 1423, 1383, 1210, 974, 870, 762, and 532 $cm^{-1}$; and the γ-phase (phase III) has specific peaks at frequencies of 840 and 880 $cm^{-1}$. (References: Macromolecules, Vol. 35, pp. 2682-2688, 2002, and Polymer, Vol. 42, pp. 1407-1416, 2001)

Figure 2:
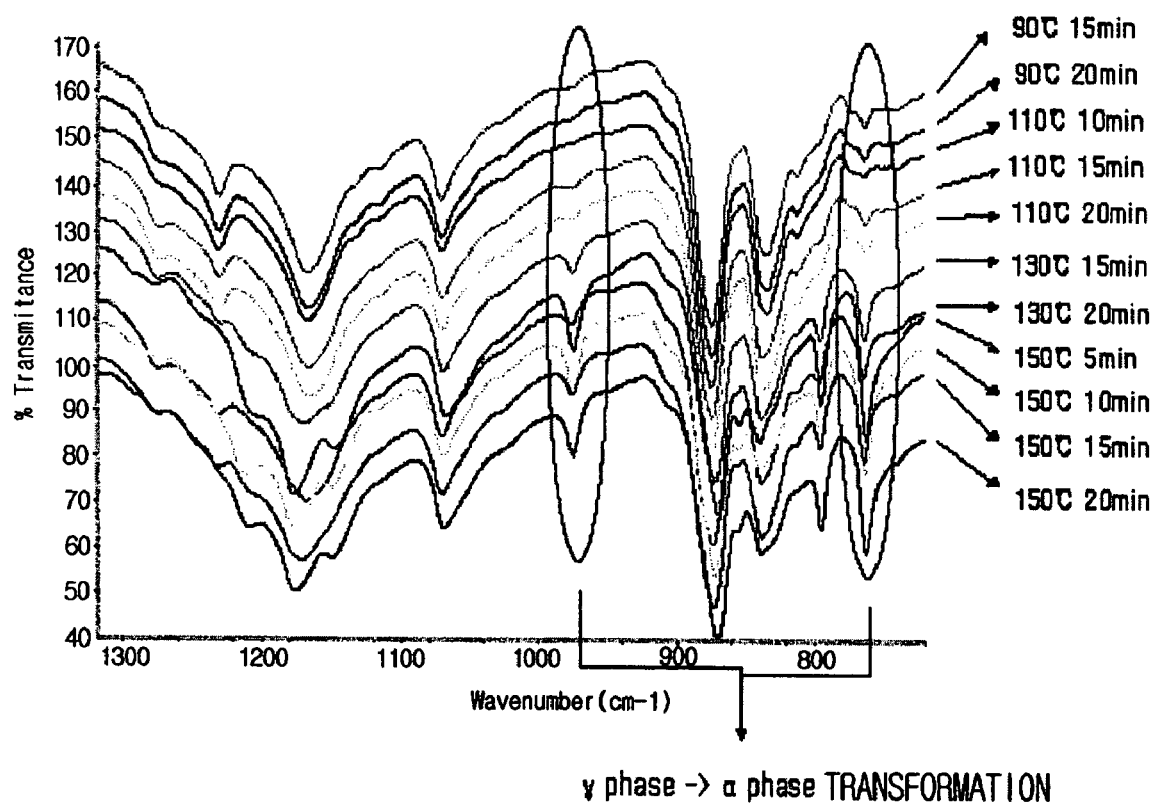
FIG. 2 is the Fourier transform infrared (FT-IR) spectra of a PVDF binder when the drying temperature and the drying time are varied.

PVDF can have various characteristics according to conditions. As a representative case, the relationship of the characteristics of PVDF and drying temperature was measured to confirm that the γ-phase can be converted into the α-phase according to the temperature and time when a PVDF film is coated. The results are shown in FIG. 2. FIG. 2 is the FT-IR spectra of PVDF films when the drying temperature is in the range of 90-150° C. and the drying time are in the range of 10-20 minutes. In FIG. 2, the content of the α-phase varies according to the drying temperature and the drying time. In these FT-IR spectra, the peaks in the 820-850 $cm^{-1}$ region result from $CH_2$ rocking bands of γ-phase-containing compounds and the peaks in the 880-860 $cm^{-1}$ region result from backbones of α-phase-containing compounds and γ-phase-containing compounds. Accordingly, a ratio of the γ-phase in PVDF can be determined from the ratio of the peak heights of $CH_2$ rocking bands in γ-phase PVDF and the peaks of the backbones of α-phase PVDF and γ-phase PVDF.

The ratio of the γ-phase in PVDF can be represented by the equation 1. Here, the ratio of the γ-phase is denoted by $I_\gamma$, which represents the ratio of the γ-phase to the α-phase and the γ-phase.

$$I_\gamma = I_{820-850}/I_{860-880} \qquad (1)$$

wherein $I_{820-850}$ is a peak height resulting from a $CH_2$ rocking band in the γ-phase-containing compound and $I_{860-880}$ is a peak height resulting from a backbone in the α- and γ-phase containing compound.

As described above, the composition of the γ-phase of PVDF in a binder can be determined using the specific peak of the γ-phase.

In the present invention, PVDF having more γ-phase crystals has a small, uniform size. As a result, the binding force of an active material becomes strong and ions can move freely. Moreover, in practice, the crystalline phase can be easily measured in the manufacturing process using FT-IR, so that a binder having the γ-phase-containing compound, which has a uniform size due to a high degree of crystallization, can be manufactured without performing a charge/discharge test. As a result, a battery with enhanced charge/discharge efficiency can be manufactured at low cost.

PVDF according to the present invention may have different crystalline phases according to crystallization temperature, crystallization pressure, mechanical stress, a solvent, or crystallization conditions. PVDF having more γ-phase crystals can be formed in the manufacture of a lithium battery electrode. For example, the manufacturing process may include preparing an active material solution by mixing an electrode active material (i.e., a cathode active material or an anode active material), a conducting agent, and PVDF used as a binder in an organic solvent; coating a surface of an electrode plate (i.e., a cathode surface or an anode surface) with the active material solution; and pressurizing the surface (i.e., the anode surface or the cathode surface) and drying the pressed surface in a vacuum. A lithium battery manufactured using the above-mentioned method may have an anode surface or a cathode surface in which the γ-phase crystals most dominate the composition of PVDF.

Any conventional organic solvent that is used in common batteries can be used in the present invention without particular limitation. However, the organic solvent may be a compound having relatively strong dipole moments. Examples of the compound include dimethylformamide(DMF), dimethylsulfoxide(DMSO), dimethylacetate(DMA), acetone, and N-methyl-2-pyrrolidone (hereinafter referred as NMP). In particular, the compound may be preferably NMP because a large amount of γ-phase crystals can be obtained using NMP. The ratio of PVDF to the organic solvent may be 1:0.1 through 100 (by weight). If the ratio of the organic solvent is less than 0.1, PVDF does not fully dissolve and cannot act as a binder. If the ratio of the organic solvent exceeds 100, PVDF dissolves well, but a concentration of the active material solution is too low, undesirably causing problems in a coating process.

In addition, when an anode surface or a cathode surface is coated with the active material solution, the coating speed also affects the crystalline phase of PVDF. If the coating speed increases, the amount of α-phase crystals increases, thereby degrading charge/discharge efficiency. The coating speed may be in the range of 10-30 m/min. If the coating speed is less than 10 m/min, it takes more time to manufacture electrodes. If the coating speed exceeds 30 m/min, drying is performed at a high temperature for a short time so that most of the PVDF is crystallized into α-phase. Therefore, if a lithium battery contains the electrode coated at such a high speed, the charge/discharge efficiency and lifespan efficiency degrade.

A pressurizing process is further carried out after the cathode surface or the anode surface is coated with the active material solution. Through the pressurizing process, the filling ratio of the active material and the electrode binder in the electrode are increased, and electrical contact is improved. The pressurizing process may be performed at a pressure of 1 to 1,000 $kg/cm^{-3}$. If the pressure is less than 1 $kg/cm^{-3}$, the filling ratio and the electrical contact probably decrease. If the pressure exceeds 1,000 $kg/cm^{-3}$, the active material and a current collector can be destroyed.

The drying temperature in the coating process also affects the crystalline phase composition of PVDF. If the drying temperature is too high, a large amount of crystalline phases other than the γ-phase crystals can be created. Therefore, the drying temperature may be in the range of 80-120° C.

To determine whether the γ-phase crystals are major crystals in the crystalline composition of PVDF, KBr powder is initially pulverized to obtain a background spectrum. The anode active material, the cathode active material, and KBr (available from Aldrich, IR grade) are pulverized in a mortar to obtain fine and uniform powder. Samples are measured using a FT-IR spectrometer (FTS 6000, 4000-650 $cm^{-3}$), preferably, the diffuse reflectance infrared Fourier transmission (DRIFT) method. The DRIFT method is a kind of IR spectroscopy method applied to, for example, graphite powder. In DRIFT, a peak reduction due to scattering by powder samples can be corrected.

Figure 1:
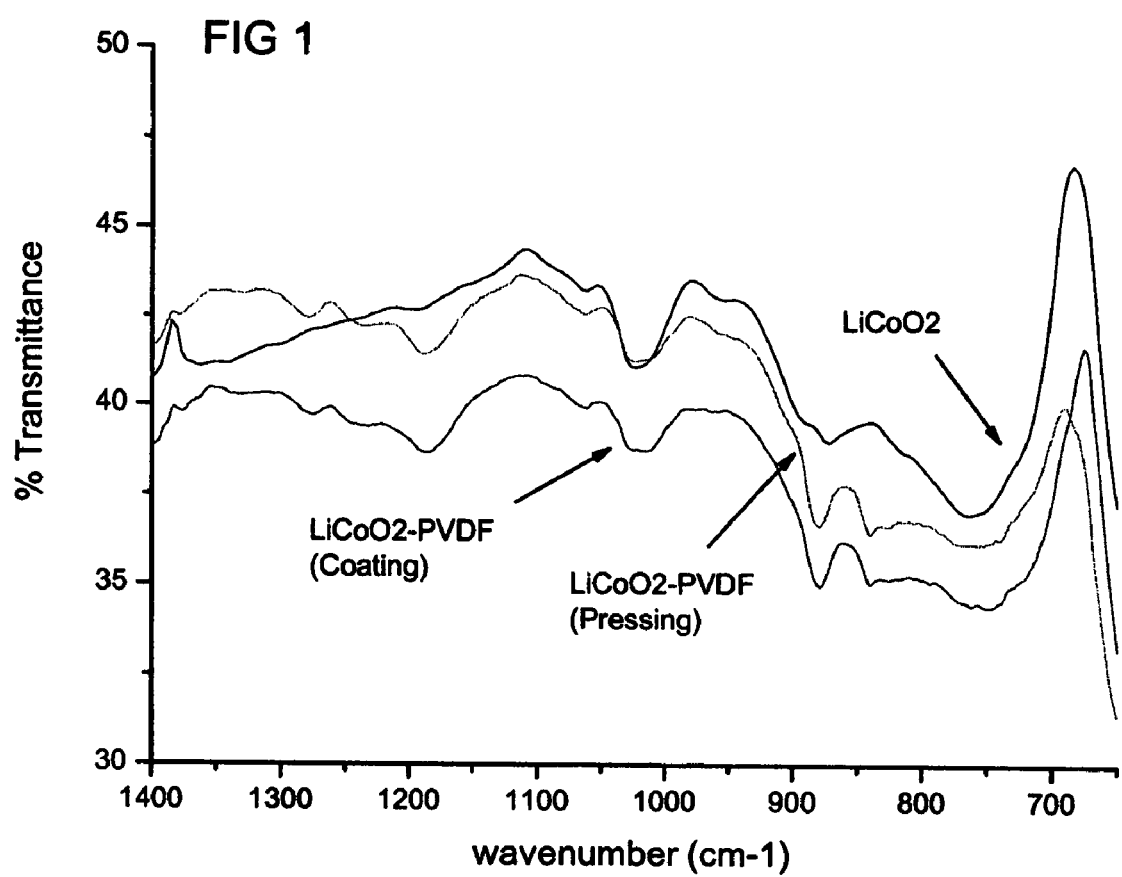
FIG. 1 comparatively illustrates peaks of $LiCoO_2$ and polyvinylidenefluoride (PVDF) according to processing conditions.

FIG. 1 comparatively illustrates peaks of $LiCoO_2$ and polyvinylidenefluoride (PVDF) according to processing conditions of coating and pressing. Referring to FIG. 1, a PVDF peak and a $LiCoO_2$ peak overlap at a frequency of around 880 $cm^{-1}$. Therefore, the PVDF peak height can be obtained by removing the $LiCoO_2$ peak from a spectrum of the cathode active material. The β-phase-containing compound, which is similar to the γ-phase-containing compound, is generated under harsh conditions. In the spectrum, a β-phase peak of 1280 $cm^{-1}$ does not appear, indicating the β-phase almost does not exist in PVDF according to the present invention.

Any cathode surface that is commonly used in the art is useful in the present invention without particular limitation. The cathode surface is a chemically non-reactive electrical conducting agent such as, preferably, aluminum foil. Examples of the cathode active material, with which the cathode surface is coated, include at least one of lithium composite oxide, elemental sulfur, casolite in which $Li_2S_n$ where $n \geq 1$ is dissolved, organosulfur and $(C_2S_x)_y$ where $2.5 \leq x \leq 20$ and $y \geq 2$. In the present invention, the amount of the cathode active material is in the range of 90-99% by weight with respect to the entire cathode composition. If the amount is less than 90% by weight, the battery performance becomes poor due to the lack of the active material. The amount exceeds 99% by weight, the dispersibility and binding force of the active material decreases.

Any anode surface that is a chemically non-reactive electrical conducting agent commonly used in the art can be used in the present invention without particular limitation. Examples of the anode surface include stainless steel, nickel, Cu, and titanium. Here, the surfaces of the stainless steel or Cu may be coated with C, Ni, Ti or Ag. The anode surface is preferably composed of Cu or a Cu alloy, wherein Cu is more preferred.

Any anode active material commonly used in the art to coat the anode surface can be used in the present invention without particular limitation. The anode active material may be a graphite-based material, such as natural graphite, artificial graphite, coke, and carbon fiber; a compound containing at least one element such as Al, Si, Sn, Ag, Bi, Mg, Zn, In, Ge, Pb, and Ti, which can alloy with Li; a composite composed of the compound containing at least one element which can alloy with Li, the graphite-based material, and carbon; or a lithium-containing nitride. The anode active material plays a key role in the battery performance. A larger amount of the anode active material results in better battery performance. In the present invention, the amount of the anode active material may be in the range of 90-99% by weight with respect to the entire anode composition. If the amount of the anode active material is less than 90% by weight, the battery performance deteriorates due to the lack of the anode active material. If the amount of the anode active material exceeds 99% by weight, the dispersibility and binding force of the anode active material decreases.

Any conducting agent that is commonly used in the art can be used in the present invention without particular limitation. Examples of the conducting agent include carbon black and nickel powder. The amount of the conducting agent may be in the range of 0-10% by weight, preferably 1-8% by weight, based on the electrode composition.

A cathode and an anode, which contain the PVDF binder according to the present invention, can be used to manufacture a lithium battery.

An electrolytic solution of the lithium battery according to the present invention includes a lithium salt. Any lithium compound that dissolves in an organic solvent to produce lithium ions can be used as a lithium salt. For example, at least one ionic lithium salt such as lithium perchloric acid ($LiClO_4$), lithium tetrafluoroboric acid ($LiBF_4$), lithium hexafluorophosphoric acid ($LiPF_6$), lithium trifluoromethanesulfonic acid ($LiCF_3SO_3$), and lithium bis(trifluoromethanesulfonyl)amide ($LiN(CF_3SO_2)_2$) can be used. A concentration of the lithium salt may be in the range of 0.5-2.0M. If the concentration of the lithium salt is outside of this range, ionic conductivity is undesirably low. An organic electrolytic solution containing such an inorganic salt is used so that a path through which lithium ions flow in a current flow direction can be formed.

Examples of the organic solvent for the electrolytic solution suitable for the present invention include polyglymes, oxolanes, carbonates, 2-fluorobenzene, 3-fluorobenzene, 4-fluorobenzene, dimethoxyethane, and diethoxyethane. These solvents may be used individually or in a combination of two or more.

Examples of polyglymes include diethyleneglycol dimethylether ($CH_3(OCH_2CH_2)_2OCH_3$), diethyleneglycol diethylether ($C_2H_5(OCH_2CH_2)_2OC_2H_5$), triethyleneglycol dimethylether ($CH_3(OCH_2CH_2)_3OCH_3$), and triethyleneglycol diethylether ($C_2H_5(OCH_2CH_2)_3OC_2H_5$). These polyglymes may be used individually or in a combination of two or more.

Examples of dioxolanes include 1,3-dioxolane, 4,5-diethyl-dioxolane, 4,5-dimethyl-dioxolane, 4-methyl-1,3-dioxolane, and 4-ethyl-1,3-dioxolane. These dioxolanes may be used individually or in a combination of two or more.

Examples of carbonates include methylene carbonate, ethylene carbonate, diethyl carbonate, dimethyl carbonate, γ-butyrolactone, propylene carbonate, dimethyl carbonate, methylethyl carbonate, diethyl carbonate, and vinylene carbonate. These carbonates may be used individually or in a combination of two or more.

The organic solvent may be a mixture of ethylene carbonate (EC), ethylmethyl carbonate (EMC), propylene carbonate (PC), and fluorobenzene (FB); and a mixture of diglyme (DGM) (also called as "diethyleneglycol dimethylether"), dimethoxyethane (DME), and 1,3-dioxolane (DOX).

The amount of the organic solvent is the same as that of an organic solvent used in a conventional lithium battery.

The electrolytic solution according to an embodiment of the present invention is added by using the conventional methods when manufacturing lithium batteries. The conventional methods include, but are not limited to, the following methods:

(1) A method including injecting the electrolytic solution into a capsulated electrode assembly, which includes a cathode, an anode and a separator;

(2) A method including: coating electrodes or a separator with a polymer electrolyte containing a matrix forming resin and the electrolytic solution; forming an electrode assembly using the coated electrodes and separator; and sealing the electrode assembly in a battery case; or (3) A method including: coating electrodes or a separator with a polymer electrolyte containing a matrix forming resin and the electrolytic solution; forming an electrode assembly using the coated electrodes and separator; sealing the electrode assembly in a battery case; and polymerizing inside of the battery. Here, this method can be applied when a freepolymer or polymerization monomer is used as the matrix forming resin.

Any separator that is commonly used in lithium batteries can be used in the present invention without limitation. The separator may have high water binding capacity and is less resistant to the migration of ions in the electrolyte. Examples of the separator include a glass fiber, polyester, TEFLON, polyethylene, polypropylene, polytetrafluoroethylene (PTFE) and combinations of these materials, which may be in non-woven or woven fabric form. In particular, the separator may be a polyethylene and/or polypropylene multi-porous membrane, which is less reactive to an organic solvent and guarantees safety.

Any material that is commonly used as a binder of an electrode plate can be used as a matrix forming polymer resin in the method according to the present invention without limitation. Examples of the matrix forming polymer resin include vinylidene fluoride/hexafluoropropylene copolymer, polyvinylidenefluoride, polyacrylonitrile, polymethylmethacrylate and combinations of these materials.

The matrix forming polymer resin may further include a filler that enhances mechanical strength of the polymer electrolyte. Examples of the filler include silica, kaolin, and alumina. In addition, the matrix forming polymer resin can further include a plasticizer if needed.

The electrolytic solution according to the present invention can be used in common lithium batteries, such as primary batteries, secondary batteries, and sulfur batteries.

The electrolytic solution according to the present invention can be used in cylindrical and rectangular lithium batteries, without limitation.

The present invention will be described in greater detail with reference to the following examples. These examples are for an illustrative purpose only and are not intended to limit the scope of the invention.

Example 1

96% by weight of graphite as an anode active material and 2% by weight of PVDF as a binder were mixed with 2% by weight of carbon black as a conducting agent, which improves mobility of electrons. 100 ml of N-methyl-2-pyrrolidone (NMP) and ceramic balls were added to the mixture and stirred in a 200 ml plastic container for 10 hours. A copper sheet with a thickness of 12 μm was coated with the mixture using a 300 μm-spaced doctor blade at a coating speed of 10 m/min. The coated copper sheet was dried in an oven at 120° C. for 12 hours until NMP fully vaporized. The NMP-free sheet was dried in a vacuum at a pressure of 300 kg/cm$^{-3}$ and cut to a predetermined size to obtain an anode plate having a thickness of 120 μm.

0.21 g KBr (available from Aldrich, IR grade) and 0.07 g of a mixture, which was prepared by mixing a conducting agent (carbon black), a binder (PVDF), and anode powder collected from the anode plate, that is, an anode active material (graphite), were pulverized in a mortar until fine and uniform powder was obtained. The resultant powder was analyzed by the diffuse reflectance infrared Fourier transmission (DRIFT) method using a FT-IR spectrometer (FTS 6000, 4000~650 cm$^-$). The results are shown in FIG. 3. In the IR spectrum, a ratio of a peak height at a frequency of 840 cm$^{-1}$ to a peak height in the 860~880 cm$^1$ region was measured and the ratio was denoted by $I_y$. The results are shown in Table 1.

Comparative Example 1

An anode plate was manufactured in the same manner as in Example 1, except that the drying temperature was 150° C. instead of 120° C. In the same manner as in Example 1, a ratio (I) of a peak height at a frequency of 840 cm$^{-1}$ to a peak height in the 860~880 cm$^{-1}$ region (FIG. 3) was measured. The results are shown in Table 1.

Example 2

An anode plate was manufactured in the same manner as in Example 1, except that the drying temperature was 110° C.

instead of 120° C. and the coating speed was 20 m/min instead of 10 m/min. In the same manner as in Example 1, a ratio (I) of a peak height at a frequency of 840 cm$^{-1}$ to a peak height in the 860~880 cm$^{-1}$ region (FIG. 3) was measured. The results are shown in Table 1.

Comparative Example 2

An anode plate was manufactured in the same manner as in Example 1, except that the coating speed was 40 m/min instead of 10 m/min. In the same manner as in Example 1, a ratio (I) of a peak height at a frequency of 840 cm$^{-1}$ to a peak height in the 860~880 cm$^{-1}$ region (FIG. 3) was measured. The results are shown in Table 1.

TABLE 1

Comparison of peak height from a PVDF binder in anode active materials

| | A peak height | | |
|---|---|---|---|
| | H-880 | H-840 | I |
| Example 1 | 0.006 | 0.005 | 0.83 |
| Comparative Example 1 | 0.007 | 0.002 | 0.29 |
| Example 2 | 0.007 | 0.005 | 0.71 |
| Comparative Example 2 | 0.006 | 0.002 | 0.33 |

Example 3

An anode plate was manufactured in the same manner as in Example 1, except that the drying temperature was 110° C. instead of 120° C. and the coating speed was 15 m/min instead of 10 m/min. In the same manner as in Example 1, a ratio (I) of a peak height at a frequency of 840 cm$^{-1}$ to a peak height in the 860~880 cm$^{-1}$ region (FIG. 4) was measured. The results are shown in Table 2.

Example 4

An anode plate was manufactured in the same manner as in Example 1, except that the drying temperature was 100° C. instead of 120° C. and the coating speed was 20 m/min instead of 10 m/min. In the same manner as in Example 1, a ratio (I) of a peak height at a frequency of 840 cm$^{-1}$ to a peak height in the 860~880 cm$^{-1}$ region (FIG. 4) was measured. The results are shown in Table 2.

Comparative Example 3

An anode plate was manufactured in the same manner as in Example 1, except that the drying temperature was 160° C. instead of 120° C. and the coating speed was 20 m/min instead of 10 m/min. In the same manner as in Example 1, a ratio (I) of a peak height at a frequency of 840 cm$^{-1}$ to a peak height in the 860~880 cm$^{-1}$ region (FIG. 4) was measured. The results are shown in Table 2.

Example 5

An anode plate was manufactured in the same manner as in Example 1, except that the drying temperature was 80° C. instead of 120° C. In the same manner as in Example 1, a ratio (I) of a peak height at a frequency of 840 cm$^{-1}$ to a peak height in the 860~880 cm$^{-1}$ region (FIG. 4) was measured. The results are shown in Table 2.

TABLE 2

Comparison of peak height from PVDF binder in anode active material.

| | A peak height | | |
|---|---|---|---|
| | H-880 | H-840 | I |
| Example 3 | 0.005 | 0.004 | 0.80 |
| Example 4 | 0.005 | 0.002 | 0.40 |
| Comparative Example 3 | 0.006 | 0.002 | 0.33 |
| Example 5 | 0.004 | 0.002 | 0.50 |

Comparative Example 4

96% by weight of LiCoO$_2$ as a cathode active material and 2% by weight of PVDF as a binder were mixed with 2% by weight of carbon black as a conducting agent, which improves mobility of electrons. 100 ml of N-methyphyrolidon(NMP) and ceramic balls were added to the mixture and stirred in a 200 ml plastic container for 10 hours. An aluminium sheet with a thickness of 15 μm was coated with the mixture using a 250 μm-spaced doctor blade at a coating speed of 10 m/min. The coated aluminium sheet was dried in an oven at 150° C. for 12 hours until NMP fully vaporized. The NMP-free sheet was dried in a vacuum at a pressure of 500 kg/cm$^{-3}$ and cut to a predetermined size to obtain a cathode plate having a thickness of 95 μm.

0.21 g KBr (available from Aldrich, IR grade) and 0.07 g of a mixture, which was prepared by mixing a conducting agent (carbon black), a binder (PVDF), and cathode powder collected from the cathode plate, that is, a cathode active material (LiCoO$_2$), were pulverized in a mortar until fine and uniform power was obtained. The resultant powder was measured by Diffuse Reflection Infrared Fourier Transmission (DRIFT) method using a FT-IR spectrometer (FTS 6000, 4000~650 cm$^{-1}$). The results are shown in FIG. 5. A ratio of PVDF peak was measured after subtracting a spectrum of a compound composed of 100% of the cathode active material. In the entire IR spectrum, a ratio of a peak height at a frequency of 840 cm$^{-1}$ to a peak height in the 860~880 cm$^{-1}$ region was measured, wherein the ratio was denoted by I$_y$. The results are shown in Table 3.

Example 6

A cathode plate was manufactured in the same manner as in Comparative Example 4, except that the drying temperature was 120° C. instead of 150° C. In the same manner as in Comparative Example 4, a ratio (I) of a peak height at a frequency of 840 cm$^{-1}$ to a peak height in the 860~880 cm$^{-1}$ region (FIG. 5) was measured. The results are shown in Table 3.

Comparative Example 5

A cathode plate was manufactured in the same manner as in Comparative Example 4, except that the drying temperature was 110° C. instead of 150° C. and the coating speed was 40 m/min instead of 10 m/min. In the same manner as in Comparative Example 4, a ratio (I) of a peak height at a frequency of 840 cm$^{-1}$ to a peak height in the 860~880 cm$^{-1}$ region (FIG. 5) was measured. The results are shown in Table 3.

Example 7

A cathode plate was manufactured in the same manner as in Comparative Example 4, except that the drying temperature was 120° C. instead of 150° C. In the same manner as in Comparative Example 4, a ratio (I) of a peak height at a frequency of 840 cm$^{-1}$ to a peak height in the 860~880 cm$^{-1}$ region (FIG. 5) was measured. The results are shown in Table 3.

TABLE 3

Comparison of a peak height from PVDF binder in cathode active materials

| | A peak height | | |
|---|---|---|---|
| | H-880 | H-840 | I |
| Comparative Example 4 | 0.024 | 0.006 | 0.25 |
| Example 6 | 0.021 | 0.013 | 0.62 |
| Comparative Example 5 | 0.023 | 0.007 | 0.30 |
| Example 7 | 0.026 | 0.017 | 0.65 |

Example 8

Comparison of the Results of Charge/Discharge Tests on Electrode Plates Prepared in Examples 1 through 7 and Comparative Examples 1 through 5

Charge/discharge tests were carried out on batteries containing the anode plates and the cathode plates prepared in Examples 1 through 7. During the charge/discharge tests, each of the anode plates prepared in Examples 1 and 5 was used to manufacture a lithium battery with the cathode plate prepared in Example 6, and each of the cathode plates prepared in Examples 6 and 7 was used to manufacture a lithium battery with the anode plate prepared in Example 1.

Similarly, each of the anode plates prepared in Comparative Examples 1 through 3 was used to manufacture a lithium battery with the cathode plate prepared in Comparative Example 4, and each of the cathode plates prepared in Comparative Examples 4 and 5 was used to manufacture a lithium battery with the anode plate prepared in Comparative Example 1.

A 20 μm-thick polyethylene/polypropylene multiporous membrane (available from US Celgard Inc.) was used as a separator.

The multiporous membrane was interposed between the cathode plate and the anode plate. The multiporous membrane, the cathode plate, and the anode plate were wound into a jelly-roll to manufacture a battery assembly. The battery assembly was inserted into a cylindrical aluminum container. A non-aqueous electrolytic solution was added into the container and sealed, thereby completing an 1800-mAh secondary lithium battery.

5.3 g of an organic solvent mixture was used as the non-aqueous electrolytic solution. The organic solvent mixture was prepared by dissolving 1.1 M LiPF$_6$ in a mixture of ethylene carbonate (EC), ethyl methyl carbonate (EMC), propylene carbonate (PC), and fluorobenzene(FB) in a ratio of 30:55:5:10 by volume.

Charge/discharge tests were carried out on the cylindrical lithium secondary batteries under the conditions in which an initial discharge capacity was 2150 mAh, a charge current was 2150 mAh, and a discharge current was 2150 mA. The charging/discharging was repeated to determine the duration for which the first discharge capacity was maintained after the charge/discharge cycle. The results are shown in Table 4.

In Examples 1 through 7, the ratios of I$_\gamma$ are 0.35 or greater and the initial charge/discharge maintenance rates are 90% or greater. Meanwhile, in Comparative Examples 1 through 5, the ratios of I$_\gamma$ are less than 0.35, and the initial charge/discharge maintenance rates are maintained at less than 90%.

TABLE 4

Comparison of the results of charge/discharge tests and processing conditions.

| | I$_\gamma$ | Drying Temperature (° C.) | Coating Speed (m/min) | Charge/discharge cycle (times) | Discharge Capacity after charge/discharge cycle (mAh) | Initial discharge capacity maintenance rate (%) |
|---|---|---|---|---|---|---|
| Example 1 | 0.83 | 120 | 10 | 80 | 2046.8 | 95.2 |
| Comparative Example 1 | 0.29 | 150 | 10 | 60 | 1872.4 | 87.1 |
| Example 2 | 0.71 | 110 | 20 | 80 | 2031.2 | 94.5 |
| Comparative Example 2 | 0.33 | 120 | 40 | 80 | 1806.4 | 84.0 |
| Example 3 | 0.80 | 110 | 15 | 80 | 2029.4 | 94.4 |
| Example 4 | 0.40 | 100 | 20 | 80 | 2016.9 | 93.8 |
| Comparative Example 3 | 0.33 | 160 | 20 | 80 | 1806.4 | 84.0 |
| Example 5 | 0.50 | 80 | 10 | 80 | 2023.4 | 94.1 |
| Comparative Example 4 | 0.25 | 150 | 10 | 60 | 1917.6 | 89.2 |
| Example 6 | 0.62 | 120 | 10 | 60 | 2078.5 | 96.7 |
| Comparative Example 5 | 0.30 | 110 | 40 | 60 | 1858.9 | 86.5 |
| Example 7 | 0.65 | 120 | 10 | 60 | 2062.1 | 95.9 |

As is apparent from Table 4, the lithium batteries containing the PVDF binder, which has a large amount of γ-phase crystals, have a high initial discharge capacity. In addition, after the charge/discharge cycle, the initial discharge capacity maintenance rate is high. In view of these results, it is confirmed that the charge/discharge characteristics and the lifespan characteristics of the batteries are improved.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. A lithium battery electrode comprising:
   an electrode active material;
   an organic solvent; and
   a homopolymer of polyvinylidenefluoride having an IR absorption peak ratio of $I_\gamma$ in a range from 0.35 to 1.00, wherein $I_\gamma$ is equal to $I_{820-850}/I_{860-880}$ where $I_{820-850}$ is a peak height resulting from a $CH_2$ rocking band in γ-phase polyvinylidenefluoride and $I_{860-880}$ is a peak height resulting from a backbone in α-phase polyvinylidenefluoride and γ-phase polyvinylidenefluoride.

2. The lithium battery electrode of claim 1, further comprising a conducting agent.

3. The lithium battery electrode of claim 1, wherein the electrode active material is a cathode active material selected from the group consisting of lithium composite oxides, elemental sulfur, casolite containing dissolved $Li_2S_n$ where $n \geq 1$, organosulfur, $(C_2S_x)_y$ where $2.5 \leq x \leq 20$ and $y \geq 2$ and a combination thereof.

4. The lithium battery electrode of claim 1, wherein the electrode active material is an anode active material selected from the group consisting of a graphite-based material, a first compound containing at least one of Al, Si, Sn, Ag, Bi, Mg, Zn, In, Ge, Pb, and Ti, a composite of the first compound, the graphite-based material and carbon, and a lithium-containing nitride.

5. The lithium battery electrode of claim 2, wherein the conducting agent is carbon black or nickel powder.

6. The lithium battery electrode of claim 1, wherein the organic solvent is selected from the group consisting of dimethylformamide (DMF), dimethylsulfoxide (DMSO), dimethylacetate (DMA), acetone, N-methyl-2-pyrrolidone, and a combination thereof.

7. The lithium battery electrode of claim 1, wherein the amount of the electrode active material is in the range of 90-99% by weight with respect to the total electrode weight.

8. The lithium battery electrode of claim 1, wherein the lithium battery electrode is a sheet-type electrode.

9. A lithium battery comprising the lithium battery electrode of claim 1.

* * * * *